United States Patent [19]

Hechler, IV et al.

[11] 4,095,726
[45] Jun. 20, 1978

[54] PORTABLE SUPPLY TANK

[76] Inventors: Valentine Hechler, IV, 26 Meadow View Rd., Northfield, Ill. 60093; Lewis E. Masters, 120 S. Spruce St., Wood Dale, Ill. 60191

[21] Appl. No.: 737,074

[22] Filed: Nov. 1, 1976

[51] Int. Cl.² .............................................. B67D 5/64
[52] U.S. Cl. ................... 222/175; 224/5 W; 222/466
[58] Field of Search ............... 222/175, 215, 333, 180, 222/466, 468, 475; 239/652, 653, 680; 221/185; 220/18, 94 A; 224/5 BC, 5 W, 25 A, 25 R, 8 R

[56] References Cited

U.S. PATENT DOCUMENTS

| | | | |
|---|---|---|---|
| 1,340,012 | 5/1920 | Cave et al. | 224/25 A |
| 1,902,548 | 3/1933 | Fenwick | 224/5 W |
| 1,959,782 | 5/1934 | Fenwick | 224/5 W |
| 2,793,073 | 5/1957 | Bateman | 222/215 X |
| 2,937,698 | 5/1960 | Greenlee | 222/175 |
| 3,111,947 | 11/1963 | Leffler et al. | 224/25 R |
| 3,134,515 | 5/1964 | Callahan, Jr. | 222/215 |
| 3,158,293 | 11/1964 | Oishei | 222/180 |
| 3,308,997 | 3/1967 | Kelly | 222/475 |
| 3,443,710 | 5/1969 | Hills | 220/94 A |

Primary Examiner—Robert B. Reeves
Assistant Examiner—H. Grant Skaggs
Attorney, Agent, or Firm—Watson D. Harbaugh

[57] ABSTRACT

An inexpensive portable liquid supply tank that serves initially as a shipping container and as a solute or solution dispenser and pump unit carried on a person's back by shoulder straps whose upper support effort is transmitted to the tank about a center of gravity designed to be close to the carrier's back on a strain line directed through its volumetric center of gravity as determined by interbraced semi-flexible front and back walls for carrying comfort and with the straps and a liquid eduction tube extending over the shoulders of the carrier while the other ends of the shoulder straps engage the lower corners of the tank. Motion of the tank on the carrier's back maintains wettable powders in solution if any are present.

10 Claims, 4 Drawing Figures

U.S. Patent    June 20, 1978    4,095,726
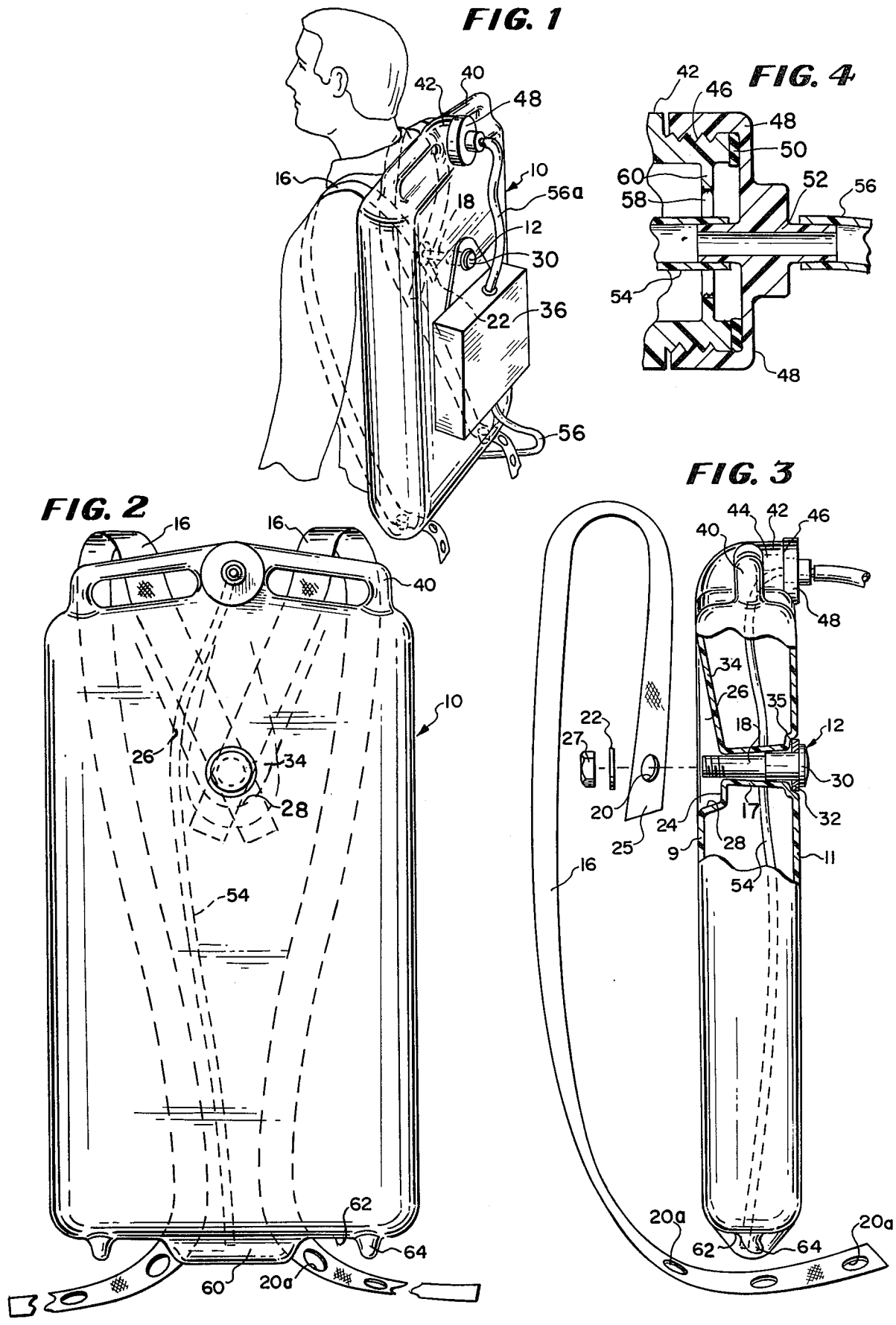

PORTABLE SUPPLY TANK

CROSS-REFERENCE:

Hechler U.S. Pat. No. 3,933,179

Hechler application Ser. No. 520,676, filed Nov. 4, 1974 now U.S. Pat. No. 3,984,052, issued Oct. 5, 1976.

BACKGROUND OF THE INVENTION

It is highly desirable to ship a quantity of chemical in a large sealed container which upon delivery can be placed on a person's back with the seal broken and the liquid dispensed over a period of time while the tank is progressively carried from place to place. Whether or not the tank is supplied as original equipment or as a premium is optional, but after initial use as a premium, instead of being discarded, it should be capable of unitization for repeated fillings and other dispensing operations, including power spraying, in which it may be easily filled on the carrier's back or readily removed therefrom for that purpose.

Moreover, with a conventional portable solute supply, there is difficulty, delay and sometimes dangerous spillage experienced in repeated replenishments particularly where large quantities of mixtures with high percentages of solute are being dispensed for substantial lengths of time in places where a continuous municipal water supply could be employed as a solution educting solvent. Such instances would include lawn treatment; wash-downs in hospitals and spaces where food is processed or handled; cleaning walls, floors or ceilings in preparation for decorating in masonry buildings; and among other things, for example, washing down and rinsing vehicles or equipment first by a pressurized solution and then by the solvent alone. In most cases the solvent could be municipal water. In fact, the use of a container, walking or riding would be substantially unlimited with a mobile power source of pressurized solvent.

SUMMARY OF THE INVENTION

In the present invention a substantial reservoir of solute of as much as 5 gallons (18.9 liters) capacity is preferably shipped in a sealed container that is constructed for easy handling and transportation on the back of a workman for supplying a mixing and dispensing device such as shown and described in the Hechler patent application Ser. No. 520,676. The invention provides for dispensing solute originally shipped or replenished therein or a solution, if desired, with great mobility, minimization of weight and fatigue. Furthermore, it establishes a substantially co-level relationship between the solute supply and the aspirating, proportioning and mixing device held in a workman's hand.

Preferably, the container is a sealed tank in which an original supply of liquid can be shipped in sealed relation and then be used with a strap harness for portability and handling in dispensing the original contents and any refills. The tank is substantially flat with front and back walls of substantial expanse bordered by top, bottom and side walls that are approximately 4 inches deep. The front and back walls of the tank are interbraced with an integral hollow strut to support them against relative deflection for maintaining the shape of the tank under all stresses and receive a strengthening bolt therethrough carrying straps whose support strain line extends in a direction not only preferably through the volumetric center of the tank with the tank thin enough and narrow enough to be carried on the back of a person without exceeding the width of an average adult carrier's shoulders in either horizontal direction, but will also receive in supported relation a light portable pump pack powered to dispense a solution under spraying pressures from the tank.

IN THE DRAWINGS

FIG. 1 is a perspective view of a tank embodying the invention as carried on a person's back along with a removable light portable liquid pump pack;

FIG. 2 is a perspective view of the front side of the tank which rests against a person's back;

FIG. 3 is a side elevation, partly in section illustrating the strap attachment and supports for carrying the tank; and FIG. 4 is a sectional view of the combination closure and hose nipples.

DESCRIPTION OF THE PREFERRED EMBODIMENT

The invention will be described, by way of example, as related to proportioning, mixing and dispensing municipal water under pressures of 15 to 100 p.s.i.g. serving as a solvent, and a liquid chemical concentrate serving as a solute having a free open flow at substantially atmospheric pressure, the solute being subject only to minor gravity influences, either positive or negative, if at all, in its movement as illustrated in Hechler Ser. No. 520,676. The mixture is dispensed from a gun (not shown) having certain proportioner-mixer characteristics under a wide range of solvent pressure change through a nozzle coacting with the gun to provide predetermined mixture ratios and accommodate differentials between the levels of the gun and the solute supply.

The proportioner-mixer-dispenser gun in application Ser. No. 520,676 is connected to the outlet of a garden hose to utilize municipal water pressure generally having a working pressure around 40 p.s.i.g., and to the outlet of the solute supply at atmospheric pressure. The mixture is dispensed from the other end of the gun as controlled by a person holding and manipulating the gun with the solute supply carried as a portable pack on a person's back and connected by flexible liquid to the liquid eduction tube in the tank.

The tank 10 is preferably a rotationally molded body having a substantially flat wall that rests against a person's back, which wall is referred to as the back wall 9, and a wall on the opposite side of the tank facing an observer will be referred to as the front wall 11.

The two walls are generally approximately 14 × 22 inches and are integrally connected by an internal hollow strut 17 opening on the outside of the front wall 11 in a recess 35 defined by a depressed wall 34 that is adapted to receive the head 30 of a bolt 18 flush with the front face as supported by a washer 32 also received in the recess 35. The hollow strut 17 at its other end opens in a depression 24 in the back wall 9 which is essentially V-shaped as indicated at 26 with the apex 28 disposed downwardly and receiving a bushing 22 against which the overlapping ends 25 of the carrying strap having holes 20 therein rest as clamped in place on the bolt 18 by a nut 27. The head 30 of the bolt 18 may also support a light self-powered pump 36 to dispense a solution stored in the tank.

From the bushing 22 the bottom wall of the recess is inclined upwardly and laterally to the front and back walls in a plane passing through the volumetric center of gravity of the tank with the side walls 9 and 11 therebelow and diverging therefrom at an inclined acute angle accommodating the lower ends of the straps 16 that are secured at their upper ends by the bolt 18 extending through the hollow strut. The bottom side walls engagements of the straps dampen any swinging of the tank, with or without a portable pump, in its plane about the axis of the bolt.

The tubular strut 17 is preferably located above the center of gravity of the tank to prevent objectionable front and back wall deflections or collapses. The bolt 18 received therethrough strengthens the connected walls and carries some weight of the filled tank and portable pump on that side where it receives flexible shoulder straps 16 connected thereto whose line of support for the filled tank, when in place, is through the center of gravity of the load of a filled tank 10, as mentioned. Thereby the tank adjusts to ride strictly upright against the carrier's back when carried by the shoulder straps and the other end of the bolt can also support other attachments associated with the tank such as the portable pump 36 by means of the plate 12.

Co-level hollow handles 40 at the top of the tank form part of the neck 42 while the hermetically sealed spout 44 (FIG. 3) protects it from damage where it is disposed within the projected confines of the top and vertical walls. The handles 40, being hollow, serve as expansion space for the liquid volume of the tank and also to prevent accidental "liquid-solid" ejection of liquid through the vent opening.

The neck 42 of the tank is molded to be about three inches in diameter with coarse threads 46 and is flanged to receive a closure 48 and washer 50 in sealed relationship thereon. The closure 48 has a nipple structure 52 therethrough which supports a flexible eduction dip tube 54 in the tank and receives a flexible service tube 56 at the other end leading to the dispensing device or to the powered pump 36 for wide open flow when used. When a pump 36 is used, a solution feed tube is used from the nipple 52 to the pump.

When the neck 42 of the tank is formed it is sealed by a frangible recessed wall 60 with the tank empty (shown in broken lines). When the tank is to be used initially for shipping purposes a small hole (not shown) is made in the recessed wall 60, the tank is filled and the fill opening heat-sealed closed again.

If the tank is furnished empty, or the tank is received full, the recessed wall is cut away at 58 and the closure 48 with the washer 50 becomes the closure which is manually removed thereafter for repeated refills, but cannot again be used for storage or shipment.

The bottom of the tank is rounded for strength and provides a central low point 62 for complete eduction emptying. The corners adjacent the back wall are recessed at 62 and have molded therein downwardly and rearwardly-directed studs 64 which are received in eyelet openings 20a on the lower ends of the tank supporting the shoulder straps 16.

Not only does the portable tank serve as an easily carried solute storage supply, but also as a vibration dampener between a carrier's back and a powered pump 36 which would be secured as described by the bolt to the tank. The liquid in the tank, even when substantially below half full, would, by hydraulic inertias and flexing walls, dampen pump vibration for the carrier and provide a very desirable and easy way of supplying solute or solution.

What is claimed is:

1. A molded portable liquid carrying tank comprising a hermetically sealed molded body having a neck defining an upper sealing wall and two spaced substantially flat and parallel vertical front and back interbraced semi-flexible walls for carrying comfort against a person's back, said walls being marginally spaced and joined by side walls at the bottom end and forming two lower corners, strut means integrally interbracing and surrounded at both ends by spaced flexible portions of the two spaced flexing walls above the center of gravity of the tank contents to support the flexible walls movement so that the walls yield as a unit in the same direction without substantially varying the volume capacity of the tank, and shoulder strap means engaging said strut means adjacent one end and the two lower corners for supporting the two walls of the tank as a unit to carry said tank in upright orientation with a motion that maintains wettable powders in solution in the tank.

2. The tank defined in claim 1 having a sealed neck with a closure receiving means around it and a closure closing the neck opening, said closure including a liquid eduction conduit and opening.

3. The tank defined in claim 2 having hollow handles adjacent the neck serving as liquid expansion spaces above the lower extremity of the neck opening.

4. The tank in claim 1 in which said strut means is tubular and includes a bolt means extending through said tubular strut to support both face walls and said shoulder strap means being secured to the bolt means at one end for supporting the tank upon a straight line projected through the center of gravity of the filled tank.

5. The tank defined in claim 4 in which the face wall at said one end thereof is recessed to define an inclined surface for contacting said flexible means above said center of gravity in a plane extending through said center of gravity.

6. The tank defined in claim 1 in which the bottom end of the tank is externally rounded centrally and a hollow stud is molded at each of the two lower corners of the tank to serve as legs coacting with the central portion to support the tank upright and receive the other ends of said flexible means in supported relation.

7. The tank defined in claim 1 in which the sealing wall has been breached and includes a closure received on the neck to carry a liquid eduction means including a nipple means extending through the cap, a liquid eduction dip tube supported on one end and a flexible service tube connected to the other end.

8. The tank defined in claim 1 including a self powered portable liquid pump;

means securing the pump to the tank at the tubular strut and resting against one of said spaced walls.

9. A molded portable liquid-carrying tank comprising a hermetically sealed body defining two spaced paralled vertical flat walls defining the major outside area of the tank, and a tubular strut integrally interbracing the walls and open at opposite ends to receive a bolt and strap means for supporting the two walls of the tank, said walls being marginally spaced and joined by side walls, one of the parallel walls having a depression therein at the end of the tubular strut and defining a secondary planar wall portion whose plane is offset to provide a recess that accommodates the strap means between the planes of the two walls and passes through the volumetric center of gravity of the filled tank to support the tank erectly on a person's back and prevent objectionable deflections of the front and back walls.

10. The tank defined in claim 9 in which said secondary planar wall is substantially V-shaped with the tubular strut opening proximate the corner of the V-shape.

* * * * *